United States Patent [19]

Robalino

[11] Patent Number: 5,585,849
[45] Date of Patent: Dec. 17, 1996

[54] AUXILIARY HANDLE FOR PORTABLE VIDEO CAMERA

[76] Inventor: Manuel Robalino, 433 Goodman Rd., Pacifica, Calif. 94044

[21] Appl. No.: 346,366

[22] Filed: Nov. 29, 1994

Related U.S. Application Data

[63] Continuation of Ser. No. 95,101, Jul. 21, 1993, abandoned.

[51] Int. Cl.$^6$ .................................................. H04N 5/225
[52] U.S. Cl. ............................................ 348/376; 348/373
[58] Field of Search ..................................... 348/376, 373; 354/81, 82, 288, 293, 294; 248/181, 316.1, 1; H04N 5/225

[56] References Cited

U.S. PATENT DOCUMENTS

| | | | |
|---|---|---|---|
| 2,703,691 | 3/1955 | Minnis | 248/161 |
| 3,437,029 | 4/1969 | Rydstedt | 95/86 |
| 4,405,223 | 9/1983 | Shull | 354/293 |
| 4,531,159 | 7/1985 | Takubo et al. | 358/229 |
| 4,640,481 | 3/1987 | Kohno | 248/126 |
| 4,687,309 | 8/1987 | Breslau | 354/82 |
| 4,915,333 | 4/1990 | Bolondi | 248/181 |
| 4,943,820 | 7/1990 | Larock | 354/82 |
| 4,946,272 | 8/1990 | Brown | 352/243 |
| 4,980,708 | 12/1990 | Leonard | 354/82 |
| 4,984,084 | 1/1991 | Sasaki et al. | 398/209 |
| 4,984,090 | 1/1991 | Sasaki | 358/229 |
| 5,081,478 | 1/1992 | Hayashida et al. | 354/81 |

*Primary Examiner*—Wendy R. Garber
*Assistant Examiner*—Andrew B. Christensen

[57] ABSTRACT

An auxiliary handle for portable video cameras. This device provides a removable structure which can be used by the operator to help hold the camera steady during recording. The handle is comprised of an extended portion which serves as the grip, a ball and socket lockable joint to orient the handle in a preferred ergonomic position and means for attaching the handle assembly to the camera. The extended length of the grip and its ability to be universally oriented allows the operator to hold the handle in multiple forms and positions below the camera. By limiting the amount that the assisting hand must be raised and by the fact that the camera's weight is supported by two hands, operator fatigue is reduced. This device also prevents the inadvertent operation of camera controls by placing the assisting hand away from their proximity.

3 Claims, 4 Drawing Sheets

AUXILIARY HANDLE FOR PORTABLE VIDEO CAMERA

BACKGROUND

This a continuation of application Ser. No. 08/095,101 filed Jul. 21, 1993, now abandoned.

1. Field of Invention

This invention relates to portable video cameras, specifically to an improved auxiliary handle for a camera.

2. Description of the Prior Art

Small portable video cameras are susceptible to jitters-small unwanted motions of the operator's hand which result in an unsteady picture. As cameras have become smaller and lighter, this problem has been aggravated. Manufacturers have used a number of different approaches to eliminate or reduce these motions. These have included electronic stabilization methods, gyroscopic stabilization of the optics and numerous passive methods such as tripods, monopods and body braces.

Heretofore, portable video cameras have been manufactured with a strap on one side through which the operator's hand passes. This allows the operator to hold the camera and to operate the primary controls simultaneously. As single hand operation can result in annoying jitters, it is recommended that the operator's free hand be used to steady the camera during recording.

Although this recommendation reduces the unwanted motions, it is not ideal. Many controls are placed where the second hand is supposed to hold the camera. This can result in accidental operation of these controls. Additionally, it is quite tiring to hold both hands and arms elevated in the recording position for any length of time. As the hands and arms tire, it also becomes harder to hold the camera steady.

Among the passive methods, tripods and monopods are successful but have the disadvantage of being bulky and reducing the portability of the camera. They also require multistep assembly and disassembly.

Several body braces and auxiliary grips have been proposed or manufactured, for example U.S. Pat. Nos. 4,943,820 (1990), 4,687,309 (1987), 4,640,481 (1987), 3,437,029 (1967), 4,984,090 (1991), 5,081,478 (1992). Although each has aimed at steadying the camera, no ideal apparatus has emerged.

Some of the disadvantages observed are similar to the ones with tripods and monopods, i.e. size and complexity. In some approaches, the operator fastens the brace to himself via belts. This requires time and effort and results in a bulky attachment that can hamper the operator's motion.

In other devices no belts are required but the brace itself is of sufficient size and weight that portability suffers.

One approach integrates many functions into a single apparatus. It can be either a brace, a clamp, a grip or a tripod. Numerous adjustments are necessary to configure the device to the desired operation. This results in a complex and higher priced apparatus.

Other approaches include a combination handle and tripod with integrated camera controls. The simplest device noted is a simple, folding, non-adjustable auxiliary handle.

The use of universally swiveling heads for adjustment of the camera position is not unusual in various tripods or braces.

However the use of such has been limited to the more complex forms of braces and supports. A universally swiveling head in combination with a simple auxiliary grip for a portable video camera has not been proposed before.

Portable video recorders have been evolving. As size and form have changed, so has a need for an improvement in the way that they are held steady during operation. In summary, the above prior art shows complex constructions whereas current needs indicate that these could be met by a simple, ergonomic and easy to adjust auxiliary handle.

3. Objects and Advantages Accordingly, several objects and advantages of the present invention are:

A. To provide an auxiliary camera handle which assists the operator of a portable video camera to hold the camera steady during operation.

B. To provide an auxiliary camera handle which is simple to use and inexpensive to manufacture.

C. To provide an auxiliary camera handle which eliminates accidental operation of camera controls by placing the operator's hand away from these.

D. To provide an auxiliary camera handle which can be easily adjusted to a preferred ergonomic position and locked in place.

E. To provide an auxiliary camera handle that can reduce fatigue by distributing the camera's weight to two hands and by lowering the height that the hand used to steady the camera must be raised.

F. To provide an auxiliary camera handle which can be removed easily and stored compactly.

The above and other objects, features and advantages of the present invention will become apparent from a consideration of the ensuing description and drawings.

DRAWING FIGURES

In the drawings, closely related figures have the same number but different alphabetic suffixes.

Figure 1:
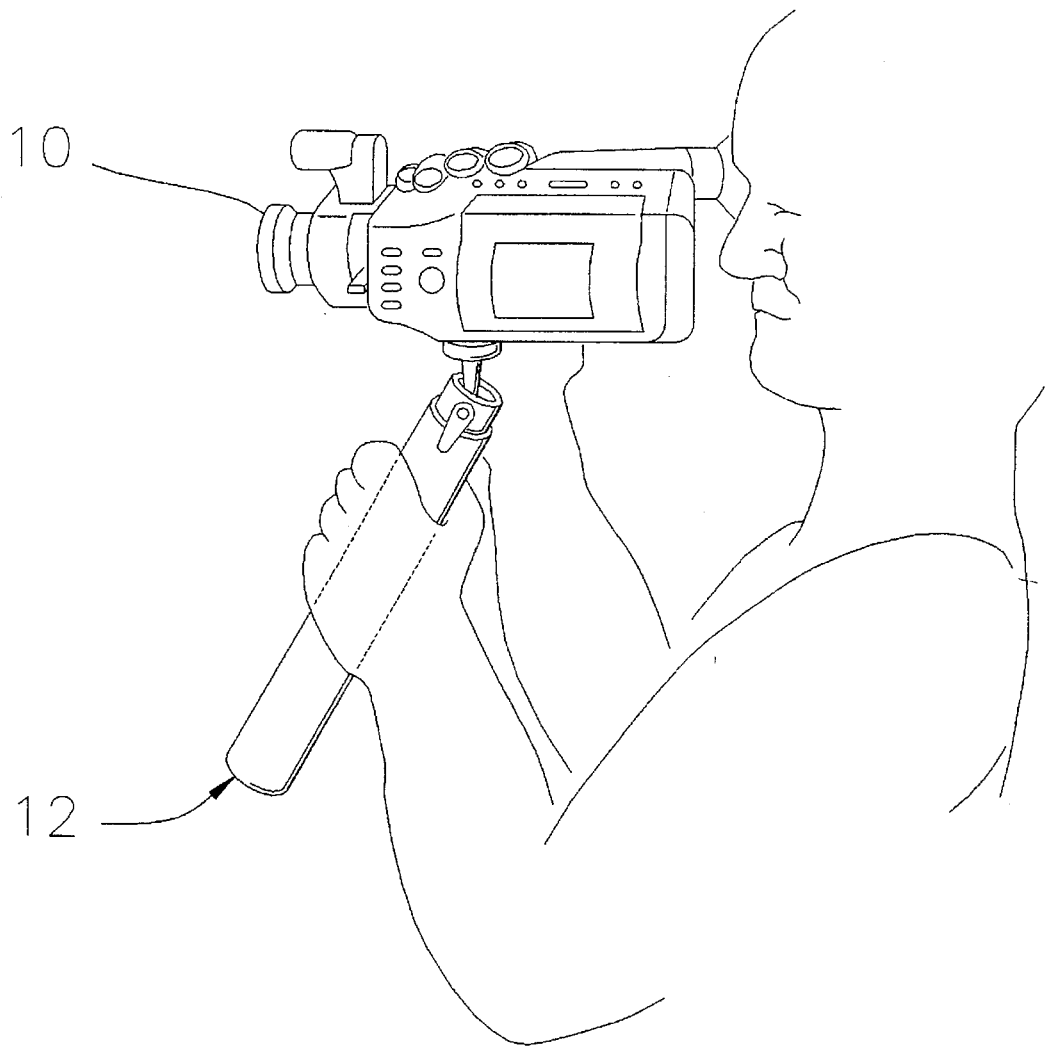
FIG. 1 shows an overall view of an auxiliary handle embodying the present invention attached to a portable video camera.
Figure 2A:
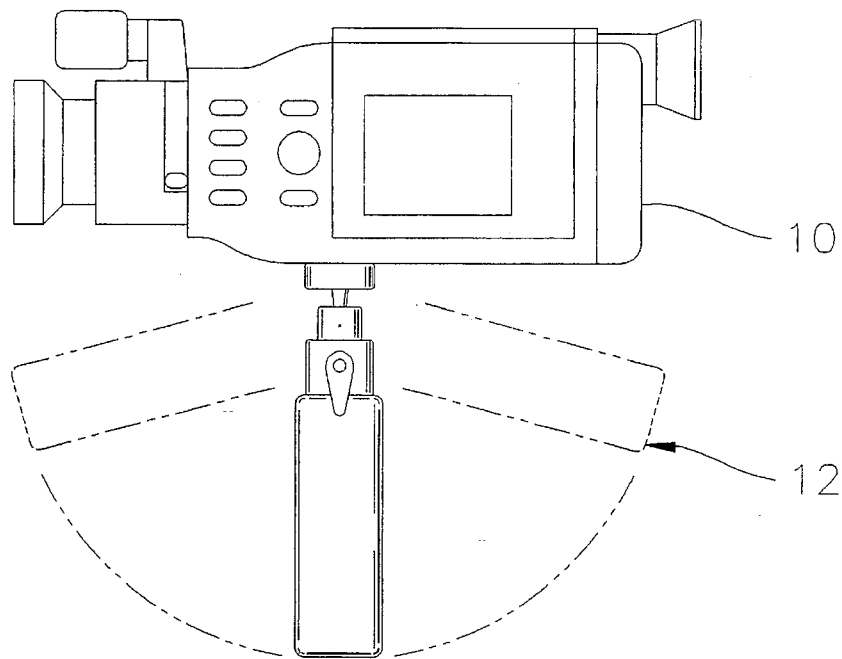
FIGS. 2A to 2C show a side view, a rear view and a top view respectively of a camera and auxiliary handle. These show a range of motions and several possible positions that the auxiliary handle may assume.
Figure 2B:
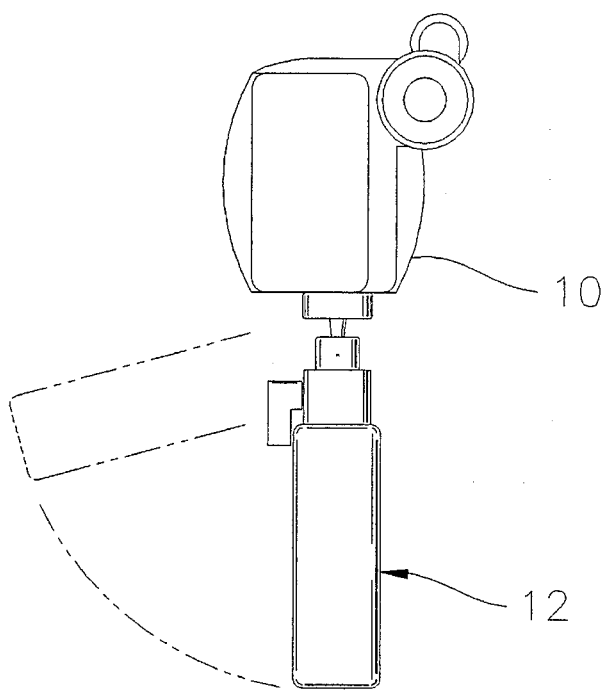
Figure 2C:
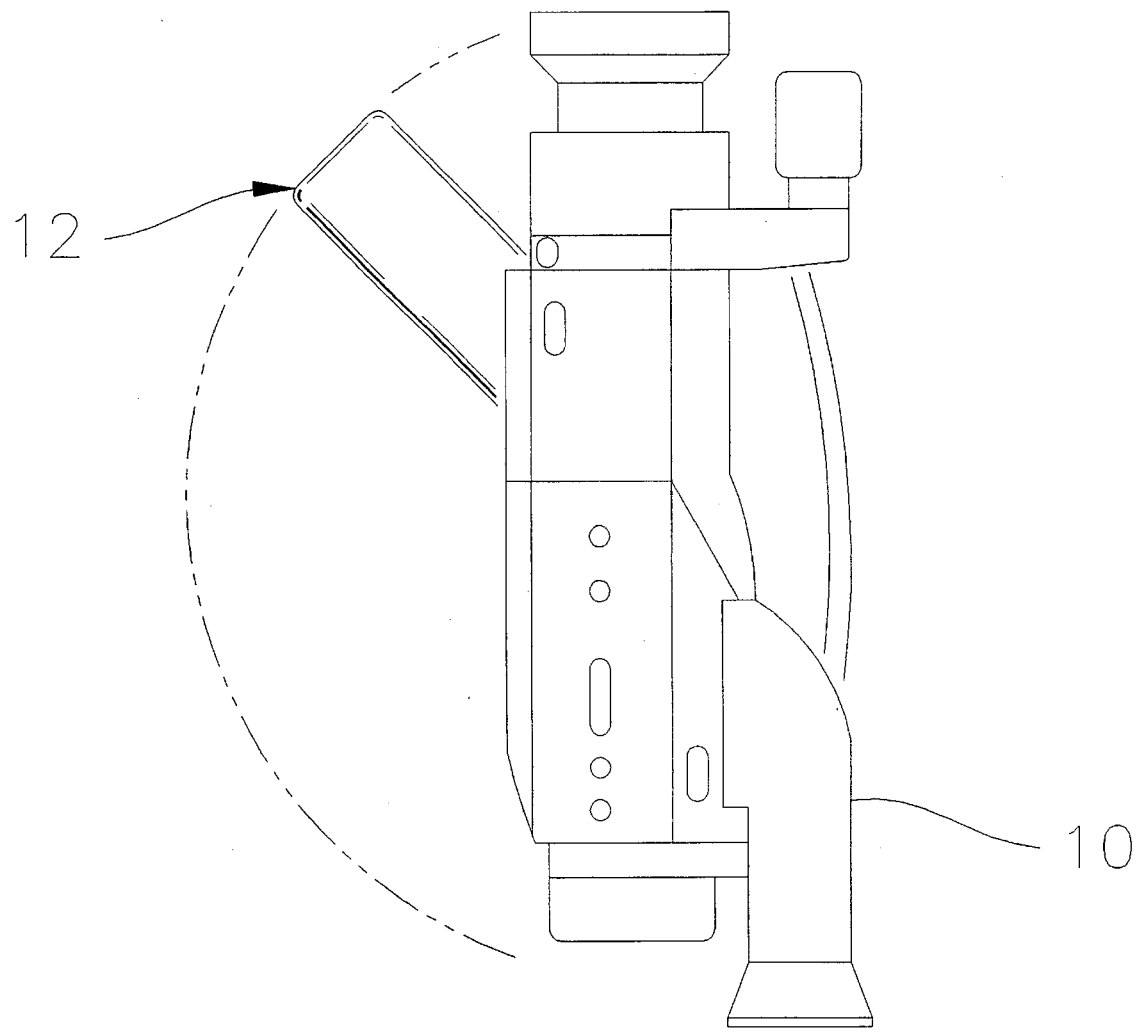

| REFERENCE NUMERALS IN DRAWINGS | | | |
|---|---|---|---|
| 10 | PORTABLE VIDEO CAMERA | 26 | CUSHION |
| 12 | AUXILIARY HANDLE | 28 | CUTOUT |
| 14 | THREADED POST | 30 | BALL |
| 16 | LOCK WHEEL | 32 | CAM SHAFT |
| 18 | SPHERICAL SOCKET | 34 | LOCK SCREW |
| 20 | CLAMP HOUSING | 36 | CLIP RING |
| 22 | LOCKING LEVER | 38 | CLAMPING PLATE |
| 24 | TUBE | | |

DESCRIPTION OF INVENTION

Figure 3:
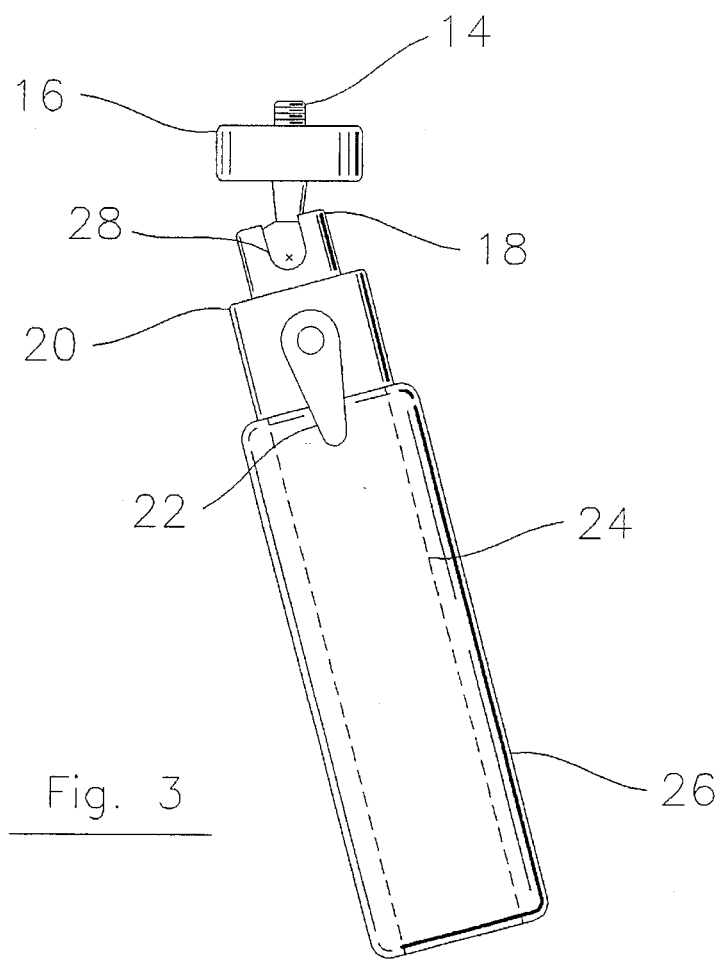
FIG. 3 shows a side view of the present invention.
Figure 4:
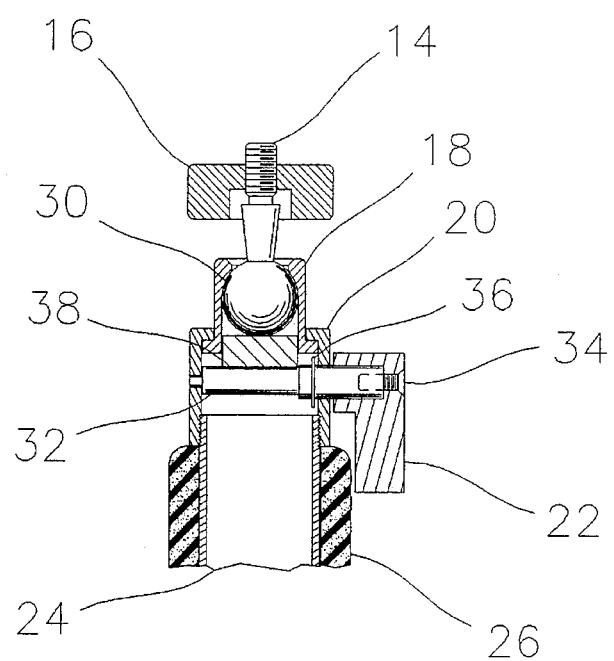
FIG. 4 shows a cross-section of the locking mechanism.

A typical embodiment of the present invention is illustrated in FIG. 1. This shows a perspective view of auxiliary handle 12 attached to a portable video camera 10. FIGS. 3 and 4 show component parts of auxiliary handle 12.

Portable video cameras are provided with a threaded hole on their underside for attachment of tripods or other accessories. A threaded post 14 is used to attach handle assembly 12 to the underside of video camera 10.

A wheel with matching internal threads, lock wheel 16, is threaded onto post 14. Once post 14 is threaded into camera 10, lock wheel 16 can be turned until it contacts the underside of camera 10. By continuing to turn lock wheel 16, a jamming action occurs which serves to secure the handle assembly 12 to the video camera 10.

The base of threaded post 14 forms a ball 30 and resides in a spherical socket 18. This forms a ball and socket joint which allows motion in multiple directions. The spherical socket 18 also contains a cutout 28 on one side which allows the threaded post 14 additional motion. By use of cutout 28, the angle between the threaded post 14 and the tube 24 can be as much as 90 degrees.

Spherical socket 18 rests freely in clamp housing 20. Spherical socket 18 with its cutout 28 is thus able to rotate 360 degrees about the longitudinal axis of clamp housing 20. This allows cutout 28 to be oriented in any position around this axis. Threaded post 14 can thus use cutout 28 at a multitude of radial positions.

Clamp housing 20 is attached to tube 24 by threaded or other means. Tube 24 forms the extension which the operator's hand can hold. Tube 24 is covered by cushion 26 to provide a comfortable surface for gripping.

FIG. 4 shows a cross-section of the locking mechanism. A cam shaft 32 passes through clamp housing 20. One end of cam shaft 32 is inserted into a hole in the wall of clamp housing 20. The other end passes through a second hole in clamp housing 20. A clip ring 36 prevents cam shaft 32 from falling out of clamp housing 20. A locking lever 22 is fastened to one end of cam shaft 32 and provides a means of rotating cam shaft 32. In this embodiment lock screw 34 holds locking lever 22 securely to cam shaft 32.

Cam shaft 32 rotates and raises clamping plate 38 which in turn forces ball 30 against spherical socket 18. Friction is thus increased and effectively holds ball 30 and threaded post 14 in a fixed position.

1. Operation of Invention

Operation of the present invention consists of the following steps:

The operator fastens threaded post 14 into the threaded hole provided on the underside of most small, portable video cameras. Locking wheel 16 is then rotated until it contacts the underside of camera 10. Further rotation results in a jamming action which secures and prevents threaded post 14 from rotating and becoming loose.

With handle assembly 12 secured to camera 10, the adjustment to a preferred ergonomic position can take place. One mode of performing the adjustment would be as follows: The operator would hold camera 10 as he normally would, i.e. the right hand would be passed through the main strap provided on the side of the camera. The operator would raise camera 10 to its recording position. With locking lever 22 in the unlocked position, auxiliary handle 12 would then be grasped with the left hand and moved to the preferred position. A simple motion of the operator's left thumb would turn locking lever 22 to fix the position. Due to the nature of a cam locking device, locking lever 22 does not need to turn more than 90 degrees in either direction to perform the locking function.

At this point the operator is ready to start recording.

2. Summary, Ramifications and Scope

Accordingly, the reader will see that the auxiliary camera handle of this invention provides a simple, inexpensive, easily and broadly adjustable device which can be used to reduce unwanted operator motions in portable video cameras.

In addition to these advantages, the present invention also makes possible a new way of holding such cameras. It permits the reduction of operator fatigue and also prevents the accidental operation of camera controls by removing the operator's hand from their proximity.

While my above description contains many specificities, these should not be construed as limitations on the scope of the invention, but rather as an exemplification of one preferred embodiment thereof.

Accordingly, the scope of the invention should be determined not by the embodiment illustrated, but by the appended claims and their legal equivalents.

What is claimed is:

1. In combination, an auxiliary handle for portable video cameras comprising;

an elongated member suitable for gripping and supporting said camera and of sufficient length that it may be held at various distances from said camera;

a ball and socket joint located at one end of said elongated member to allow multi-plane adjustment of said elongated member;

locking and unlocking means for fixing said ball and socket joint at any position within its range of travel including an actuating lever which can toggle between locked and unlocked positions and which, when force is applied by the user, is able to lock a position of said camera, and an eccentric shaft or cam operable by the application of force on said actuating lever by the gripping hand alone while holding said elongated member;

mounting means including a threaded post and locking nut located at one end of said ball and socket joint for attaching said handle to said camera whereby a camera operator can help support said camera, reduce unwanted motions, reduce the fatigue associated with his functions and easily perform a one-handed adjustment to his preferred ergonomic position without interrupting the recording session.

2. The device as defined in claim 1 wherein said locking means include a can or eccentric shaft attached to a lever which when rotated will push against and frictionally lock said ball and socket joint in position.

3. The device as defined in claim 1 wherein said elongated member is of such longitudinal dimension that the operator's hand can grip said member at a multitude of longitudinal positions, including a preferred position.

* * * * *